US006534933B2

(12) United States Patent
Shen

(10) Patent No.: US 6,534,933 B2
(45) Date of Patent: Mar. 18, 2003

(54) HIGH POWER FACTOR ELECTRONIC BALLAST WITH LOAD DEPENDENT BUS VOLTAGE REGULATION

(75) Inventor: Eric B. Shen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/855,469

(22) Filed: May 15, 2001

(65) Prior Publication Data

US 2002/0185982 A1 Dec. 12, 2002

(51) Int. Cl.[7] .................................................. G05F 1/00
(52) U.S. Cl. ........................ 315/307; 315/246; 315/291; 315/299; 315/360; 361/91.1
(58) Field of Search ............................. 315/200 R, 224, 315/225, 246, 283, 291, 299, 307, 360; 361/90, 91.1

(56) References Cited

U.S. PATENT DOCUMENTS

| 5,087,870 A | 2/1992 | Salesky et al. ............. 323/276 |
| 5,208,555 A | 5/1993 | Graham et al. ............. 331/1 A |
| 5,736,826 A | 4/1998 | Hrassky ...................... 318/678 |
| 5,914,843 A | * 6/1999 | Hopkins et al. ........ 315/DIG. 7 |
| 5,952,870 A | 9/1999 | Urban ......................... 327/404 |
| 6,326,740 B1 | * 12/2001 | Chang et al. ................ 315/194 |

* cited by examiner

Primary Examiner—Don Wong
Assistant Examiner—Thuy Vinh Tran

(57) ABSTRACT

A high power factor electronic ballast for a gas discharge lamp is disclosed which can provide bus voltage control in response to varying load conditions without the need for direct sensing of the load conditions. The electronic ballast includes an input stage; an output stage; a slow loop controller configured to regulate the bus voltage to a constant value during steady state operation; a hysteresis band over voltage protection (OVP) controller for maintaining the bus voltage in a predetermined hysteresis voltage band during open circuit and pre-ignition conditions; and an on-time limiting controller for guaranteeing a minimum on-time for the input stage. The electronic ballast further includes at least one DC bus capacitor for storing energy created from energy imbalances between the input and output stage. The novel construction makes it possible to regulate the bus voltage to a constant value under steady state conditions using the slow loop controller, and to prevent the bus voltage from increasing in an uncontrolled manner under open circuit and pre-ignition conditions using the over voltage protection controller. This is advantageously achieved without having to directly sense the load condition.

20 Claims, 2 Drawing Sheets

HIGH POWER FACTOR ELECTRONIC BALLAST WITH LOAD DEPENDENT BUS VOLTAGE REGULATION

BACKGROUND OF THE INVENTION

1. Field of the Invention

The present invention relates to a ballast, or power supply circuit for gas discharge lamps. More particularly, the invention relates to control circuitry which controls the bus voltage in response to varying load conditions without the need for direct sensing of the load conditions.

2. Description of the Related Art

Electronic ballast circuits are known in the art. FIG. 1 illustrates a conventional electronic ballast 10 including an AC source 12, an electromagnetic interference (EMI) filter 14, a pre-regulator stage 16, a DC bus capacitor 18, a lamp driver stage 20 and a load 22. The pre-regulator stage 16 serves two primary functions. First, the pre-regulator stage 16 performs input acurrent shaping (i.e., power factor correction). Second, the pre-regulator stage 16 performs bus voltage regulation. The pre-regulator stage 16 can be implemented in a number of different ways. The most common implementations utilize either a boost converter or a flyback converter. One method of controlling a boost converter to perform pre-regulation is by constructing the boost converter to operate in a critical discontinuous conduction mode, as illustrated in the circuit of FIG. 2a and the waveforms of FIG. 2b.

Referring now to FIG. 2a, at the beginning of a switching cycle, the inductor current in L1 is zero. At the instant in time transistor Q1 is turned on, the current in inductor L1 ramps up linearly. After a certain time, Q1 is switched off and the current in L1 forces diode D1 to conduct to charge bus capacitor C1. During the time D1 is conducting, the current in L1 ramps linearly downward. At the point at which the current in L1 reaches zero, D1 turns off and the switching cycle repeats.

Power factor correction is achieved in the circuit of FIG. 2a by either turning Q1 on for a constant time, or by switching Q1 off when the current in L1 reaches a value proportional to the input voltage (i.e., a rectified sinusoid). As such, the average value of the current in L1 will be a rectified sine wave in phase with the input voltage, as shown in FIG. 2b.

The bus voltage, $V_{bus}$, is regulated to a constant value by varying the on time of Q1 in order to balance the power delivered by the input and the power delivered to the output. By decreasing the on time, less power is drawn from the input and by increasing the on time, more power is drawn from the input.

The objective of most circuit applications is to control the on time of Q1 such that the bus voltage, $V_{bus}$, is maintained at a constant value for all load conditions.

For circuits designed to drive compact high intensity discharge (HID) lamps with a low frequency square wave current, $V_{bus}$, may be typically regulated to 400V during steady state operation. FIG. 3 illustrates such a circuit. However, during ignition, a higher bus voltage (i.e., on the order of 500V, (See point A) is required for proper ignition of the lamp (e.g., 250V, See point B). Simply setting the bus voltage, $V_{bus}$, to 500V is a sub-optimal solution in that a high bus voltage is only required during ignition. Maintaining a high bus voltage throughout normal steady state operation of a lamp creates stress on the components and increases losses in the circuit. Another solution is to provide circuit means to detect when the lamp is not ignited and increase the bus voltage to 500V for ignition and to reduce the bus voltage gradually to 400V after the lamp is ignited in order to reduce switching losses and component voltage stresses. Typically this requires a direct sensing of the load conditions. That is, the load voltage, load current, or even both the current and voltage must be sensed in order to determine the state of the lamp. This requires additional sensing circuitry and the corresponding controls in order to control the bus voltage to 500V prior to ignition and to 400V after some load condition has been satisfied.

It is also possible to control the bus voltage without sensing load conditions by attempting to guess the proper timing of the ignition sequence. For example, the circuit upon startup can be configured to have $V_{bus}$ at 500V. After a predetermined time, the bus voltage can be reduced to 400V. However this approach is not preferred in that the ignition behavior of the lamp can never be known or guaranteed.

Therefore a need exists to detect a load condition and adjust the bus voltage accordingly by indirect means without the need for additional sensing circuitry, so that proper ignition behavior is achieved and switching losses and component voltage stresses are reduced.

SUMMARY

It is an object of the present invention to provide a high power factor electronic ballast for a gas discharge lamp which can provide bus voltage control in response to varying load conditions without the need for direct sensing of the load conditions.

An electronic ballast for providing load dependent bus voltage regulation according to the present invention which accomplishes the above object includes: an input stage; an output stage; a first controller referred to herein as a slow loop controller configured to regulate the bus voltage to a constant value during steady state operation; a second controller referred to herein as a hysteresis band over voltage protection (OVP) controller for maintaining the bus voltage in a predetermined hysteresis voltage band during open circuit and pre-ignition conditions; and an on-time limiting controller for guaranteeing a minimum on-time for the input stage. The electronic ballast further includes at least one DC bus capacitor for storing energy created from energy imbalances between the input and output stage.

With the above construction, it is possible to regulate the bus voltage to a constant value under steady state conditions using the slow loop controller, and to prevent the bus voltage from increasing in an uncontrolled manner under open circuit and pre-ignition conditions using the over voltage protection controller. This is advantageously achieved without having to directly sense the load condition.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DETAILED DESCRIPTION OF THE PREFERRED EMBODIMENTS

Figure 1:
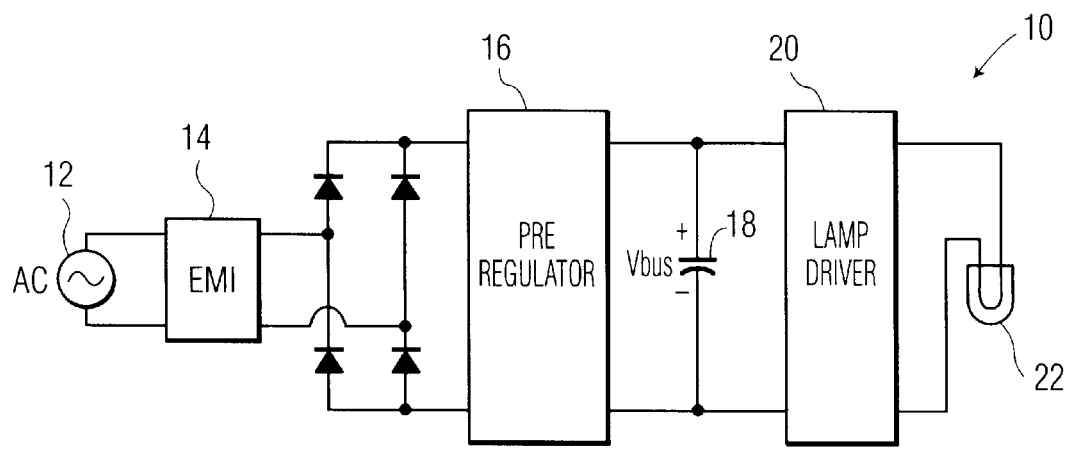
FIG. 1 is a schematic diagram of a ballast including a pre-regulator in accordance with the prior art.
Figure 2A:
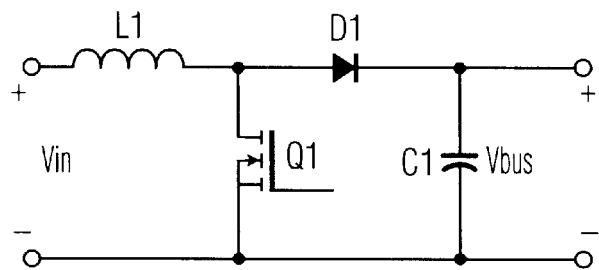
FIG. 2a is a schematic diagram of a boost converter operating in a critical discontinuous mode for performing pre-regulation.
Figure 2B:
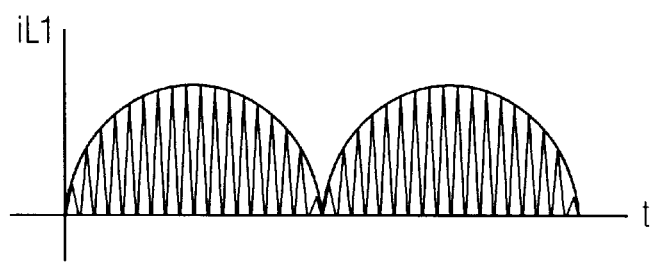
FIG. 2b depicts a wave form of the average value of the current of the inductor L1 of FIG. 2a as a rectified sine wave in phase with the input voltage.
Figure 3:
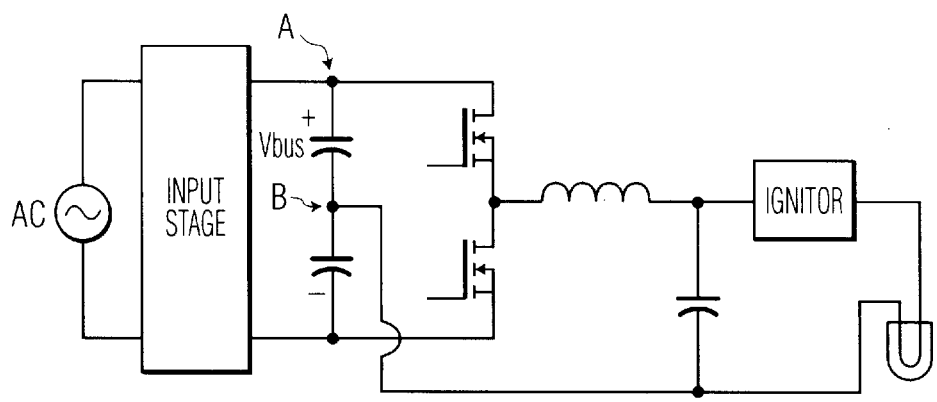
FIG. 3 is a schematic diagram of a prior art circuit designed to drive compact high intensity discharge (HID) lamps with a low frequency square wave current.
Figure 4:
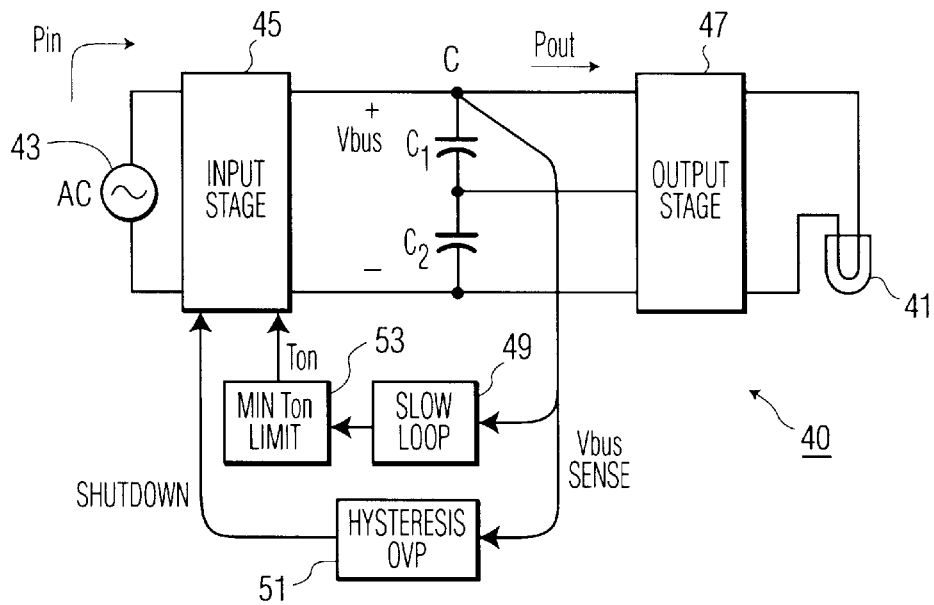
FIG. 4 is a schematic diagram of a high power factor electronic ballast according to one embodiment of the present invention.

Referring now to the drawings, in which like reference numerals and labels identify similar or identical elements throughout the several views, the high power factor electronic ballast 40 of the present invention is shown in detail in FIG. 4. As shown therein, the ballast 40 principally comprises an input stage 45, an output stage 47, a slow loop controller 49, first and second DC bus capacitors C1 and C2, a hysteresis band over voltage protection (OVP) controller 51, and a on-time limiting controller 53 according to one embodiment of the invention. A gas discharge lamp 41 is powered from a DC bus voltage, $V_{bus}$, generated by AC source 43. The DC bus voltage exists between the input stage 45 and the output stage 47, after such voltage is converted to DC by the input stage 45.

In order to describe the function of the ballast 40 it is assumed that the lamp (load) 41 connected to the output stage 47 of the ballast 40 is not yet ignited (i.e., pre-ignition). In this condition, the lamp or load 41 draws no power; however, a feature of the ballast 40, which differentiates it from a conventional ballast, is that the input stage is never fully turned off. Instead, the on-time limiting controller 53 limits the allowable on-time for the input stage 45 to a minimum allowable on-time by providing a minimum on-time signal Ton to a first input of the input power stage 45 for controlling the on-time of the input power stage 45. That is, during an open circuit condition and during lamp pre-ignition, the on-time of the input stage 45 is set to the minimum allowable on-time. In one embodiment, the on-time limiting controller 53 receives an on-time signal from the slow loop controller 49 whereby the on-time limiting controller 53 provides the minimum on-time signal Ton to the input stage 45 when the on-time signal has a value below a minimum on-time signal controller threshold value. Otherwise, the on-time limiting controller 53 provides the on-time signal to the input stage 45. In a further embodiment, the slow loop controller 49 adjusts the on-time of the input power stage 45 to a lower value when the sensed DC bus voltage is above a predetermined threshold and adjusts the on-time of the input power stage 45 to a higher value when the sensed DC bus voltage is below the predetermined threshold.

One consequence of always drawing some minimal amount of input power under the aforestated conditions is that an energy imbalance occurs between the input stage 45 and the output stage 47. This energy imbalance results in an increased bus voltage across capacitors C1 and C2. If left uncontrolled, the bus voltage $V_{bus}$ across capacitors C1 and C2 would increase without limit. To prevent this voltage runaway condition from occurring, the ballast 40 includes an over-voltage protection (OVP) controller 51. The OVP controller 51 operates by comparing the sensed bus voltage, $V_{bus}$, via a sensing terminal (See point C), with a predetermined threshold voltage, $V_{up-thresh}$ and outputs a shutdown signal to the input stage 45 whenever the sensed bus voltage, $V_{bus}$ exceeds the threshold voltage, $V_{up-thresh}$. When the shutdown signal is activated from the OVP controller 51, the input stage 45 is shut down thereby preventing any further increase in $V_{bus}$ across capacitors C1 and C2, and further causes $V_{bus}$ to decay at a slow rate. $V_{bus}$ decays across C1 and C2 until a predetermined lower threshold value is reached, referred to herein as a restart value, $V_{restart}$. When the restart value is reached, the OVP controller 51 senses this condition and relinquishes the shutdown signal allowing $V_{bus}$ to increase again. Thus, under both open circuit conditions and pre-ignition, $V_{bus}$ is maintained in a range (i.e., hysteresis band) determined by the upper and lower threshold values specified by the OVP controller 51, namely, $V_{restart}$ to $V_{up-thresh}$.

Accordingly, under open circuit and pre-ignition conditions, the input stage 45 can be characterized as operating in a burst mode with the input stage 45 being turned on and off so as to maintain $V_{bus}$ in a predetermined hysteresis band. This burst mode has the effect of reducing circuit losses while the circuit is in an open circuit condition.

Figure 5:
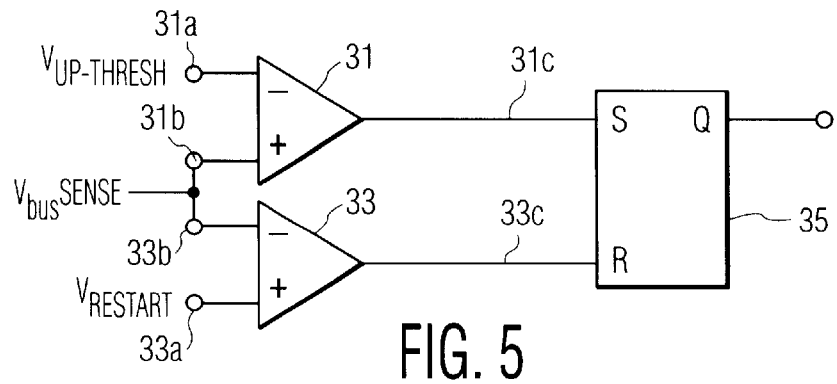
FIG. 5 is a schematic diagram of an over voltage protection (OVP) controller according to one embodiment of the present invention.

FIG. 5 illustrates one embodiment for implementing the OVP controller 51. FIG. 5 includes a first comparator 31, a second comparator 33, and a latch 35. The first comparator 31 has two inputs, a first input 31a for receiving the upper threshold bus voltage, $V_{up-thresh}$, and a second common input 31b for receiving the sensed bus voltage, $V_{bus}$. The $V_{bus}$ input is simultaneously provided to both comparators 31 and 33. The second comparator 33 has two inputs, a first input 33a for receiving a restart voltage, $V_{restart}$ and a second common input, $V_{bus}$ 33b. The output 31c of the first comparator 31 is coupled to the SET input "S" of the latch 35 and the output of the second comparator 33c is coupled to the RESET input "R" of the latch 35.

In the pre-ignition case, $V_{bus}$ will continue to transition in the hysteresis band defined by the upper and lower threshold voltages (i.e., $V_{up-thresh}$ and $V_{restart}$) until the lamp 41 is ignited. It is noted that $V_{up-thresh}$ is set sufficiently high to facilitate ignition of the lamp. After the lamp 41 ignites, the value of $V_{bus}$ will be determined by the load power. This is illustrated by way of example with reference to Table I for a 70 w lamp. As shown in the table, the bus voltage is load dependent. That is, $V_{bus}$ changes with changing load power.

TABLE I

| Load Power ($P_{out}$) | $V_{bus}$ |
|---|---|
| less than 25 W | OVP triggered; 470 V < $V_{bus}$ < 530 V |
| 30 W | 500 V |
| 35 W | 467 V |
| 40 W | 450 V |
| 45 W | 430 V |
| 50 W | 400 V |
| 70 W | 400 V |

Table I is now described in greater detail. As shown at row 1 of the table, under open circuit conditions (i.e., for power less than 25 W), conditions consistent with ignition, $V_{bus}$ is maintained within the hysteresis band defined by voltages 470V–530V. Subsequent to the lamp lighting, as the lamp power increases, $V_{bus}$ decreases proportionally. At some point, the lamp power falls into the range where the slow loop controller can regulate $V_{bus}$ to the steady state value. Shortly after the lamp 41 ignites it becomes a very low impedance, typically consuming something on the order of 20 watts initially. During this time there is an interplay between the over voltage protection controller 51 and the slow loop controller 49. The slow loop controller 49 attempts to regulate the bus voltage to 400V for steady state operation, but its effectiveness is limited by the low power consumption of the lamp 41 and the limited control range of the slow loop controller as dictated by the on-time limiting controller 53. This is illustrated at row 1 of Table I whereby it is shown that for a load power less than 25 W, the OVP controller 51 contributes much more significantly to the circuit operation than the slow loop controller 49. As the load power starts to increase after ignition, the OVP controller 51 is less controlling and the slow loop controller 49 contributes more significantly to regulate the bus voltage, $V_{bus}$, to a steady state value (e.g., 400V). This is illustrated in rows 2 through 7 of Table I, wherein it is shown that as the load power increases from 30 W to 70 W, the bus voltage, $V_{bus}$ eventually falls outside the range specified by the OVP controller (e.g., 470V–530V, the hysteresis band). As the lamp power increases, the value of $V_{bus}$ decreases to a point at which the lamp power falls into a range where the slow loop controller 49 can regulate $V_{bus}$ to the steady state value (e.g., 400V).

While the invention has been described with respect to specific embodiments by way of illustration, many modifications and changes will be apparent to those skilled in the art. It is therefore, to be understood that the appended claims are intended to cover all such modifications and changes as fall within the true spirit and scope of the invention.

What is claimed is:

1. In a ballast circuit for a gas discharge lamp, a circuit configuration for indirectly controlling a bus voltage in response to varying load conditions, said circuit configuration comprising:
   (a) an input stage coupled to an AC source, said input stage converting an AC voltage to a direct current (DC) bus voltage;
   (b) an overvoltage protection controller having a sensing terminal coupled to an output of the input stage for sensing the DC bus voltage and an output connected to a first input of the input stage for shutting down the input stage when the sensed DC bus voltage is above an upper threshold voltage and for restarting the input stage when the sensed DC voltage is below a lower threshold voltage;
   (c) a slow-loop controller having a sensing terminal coupled to said output of the input stage for sensing the DC bus voltage and for outputting an on-time signal responsive to said sensed DC bus voltage;
   (d) an on-time controller having an input coupled to an output of said slow loop controller and an output coupled to a second input of said input stage, said on-time controller providing one of a minimum on-time signal and said on-time signal; and
   (e) an output stage for receiving power from said input stage, said output stage supplying a low-frequency square wave of current to drive at least one load.

2. The ballast circuit of claim 1, wherein said overvoltage protection controller comprises:
   a first comparator having a first input coupled to said upper threshold voltage and a common second input coupled to said DC bus voltage;
   a second comparator having a first input coupled to said lower threshold voltage and a common second input coupled to said DC bus voltage;
   a latch having a set input coupled to an output of said first comparator and a reset input coupled to an output of said second comparator, said latch outputting a shutdown signal to said input stage when said DC bus voltage is greater than said upper threshold voltage, said latch outputting a reset signal to said input stage when said DC bus voltage is less than said lower threshold voltage.

3. The ballast circuit of claim 1, further comprising a first and a second DC bus capacitor for storing said DC bus voltage.

4. The ballast circuit of claim 1, wherein the at least one load is a gas discharge lamp.

5. A method for indirectly controlling a direct current (DC) bus voltage in an electronic ballast in response to varying load conditions, said method comprising the steps of:
   (a) maintaining a DC bus voltage in a range defined by a lower voltage and a upper voltage in one of a pre-ignition and open circuit state mode of operation of the electronic ballast;
   in each of a pre-ignition state, open circuit state and steady state mode of operation of said electronic ballast:
   (b) simultaneously sensing said DC bus voltage output from an input power stage by a slow loop controller and an overvoltage protection controller;
   (c) outputting from said slow loop controller an on-time signal to an on-time controller responsive to said sensed DC bus voltage at step (b); and
   (d) providing one of a minimum on-time signal and said on-time signal to a first input of said input power stage for controlling the on-time of said input power stage.

6. The ballast circuit of claim 5, wherein step (d) further comprises the step of outputting said minimum on-time signal when said on-time signal has a value below a minimum on-time signal controller threshold value, and otherwise outputting said on-time signal.

7. The method of claim 5, further comprising the step of outputting a shut down signal from said overvoltage protection circuit to said input power stage when said sensed DC bus voltage is greater than said upper threshold voltage and otherwise relinquishing said shut down signal when said sensed DC bus voltage is below said lower threshold voltage.

8. The method of claim 5, wherein step (c) further comprises the step of said slow loop controller adjusting the on-time of said input power stage to a lower value when said sensed DC bus voltage is above a predetermined threshold and said slow loop controller adjusting the on-time of said input power stage to a higher value when said sensed DC bus voltage is below said predetermined threshold.

9. The method of claim 5, wherein said upper threshold voltage is sufficient to facilitate ignition of a load.

10. The method of claim 9, wherein the load is a gas discharge lamp.

11. In a ballast circuit for a gas discharge lamp, a circuit configuration for indirectly controlling a bus voltage in response to varying load conditions, said circuit configuration comprising:
    an input stage operable to convert an AC voltage to a DC bus voltage;
    an output stage operable to supply a low-frequency square wave of current to drive at least one load in response to a conversion of the AC voltage to the DC bus voltage; and
    an overvoltage protection controller operable to sense the DC bus voltage, said overvoltage protection controller further operable to shut down said input stage when the sensed DC bus voltage is above an upper threshold voltage and to restart said input stage when the sensed DC voltage is below a lower threshold voltage.

12. The circuit configuration of claim 11, wherein said overvoltage protection controller includes comparator having a first input for receiving the upper threshold voltage and a second input for receiving the DC bus voltage.

13. The circuit configuration of claim 11, wherein said overvoltage protection controller includes comparator having a first input for receiving the lower threshold voltage and a second input for receiving the DC bus voltage.

14. The circuit configuration of claim 11, wherein said overvoltage protection controller includes a latch operable to output a shutdown signal to said input stage when said DC bus voltage is greater than said upper threshold voltage, said latch further operable to output a reset signal to said input stage when said DC bus voltage is less than said lower threshold voltage.

15. The circuit configuration of claim 11, wherein said overvoltage protection controller includes means for outputting a shutdown signal to said input stage when said DC bus voltage is greater than said upper threshold voltage.

16. The circuit configuration of claim 11, wherein said overvoltage protection controller includes means for outputting a reset signal to said input stage when said DC bus voltage is less than said lower threshold voltage.

17. The circuit configuration of claim 11, further comprising:
a pair of DC bus capacitors for storing the DC bus voltage.

18. The circuit configuration of claim 11, further comprising:
a slow-loop controller operable to sense the DC bus voltage, said slow-loop controller further operable to provide an on-time signal responsive to said sensed DC bus voltage; and
an on-time controller operable to provide one of a minimum on-time signal and the on-time signal to said input stage in response to a reception of the on-time signal.

19. In a ballast circuit for a gas discharge lamp, a circuit configuration for indirectly controlling a bus voltage in response to varying load conditions, said circuit configuration comprising:
an input stage operable to convert an AC voltage to a DC bus voltage;
an output stage operable to supply a low-frequency square wave of current to drive at least one load in response to a conversion of the AC voltage to the DC bus voltage;
a slow-loop controller operable to sense the DC bus voltage, said slow-loop controller further operable to provide an on-time signal responsive to said sensed DC bus voltage; and
an on-time controller operable to output a minimum on-time signal when the on-time signal has a value below a minimum on-time signal controller threshold value, said on-time controller further operable to output the on-time signal when the on-time signal has a value above the minimum on-time signal controller threshold value.

20. The circuit configuration of claim 19, wherein said slow loop controller is further operable to adjust the on-time of said input power stage to a lower value when the sensed DC bus voltage is above a predetermined threshold and to adjust the on-time of said input power stage to a higher value when the sensed DC bus voltage is below the predetermined threshold.

* * * * *